Aug. 27, 1968  V. GRABE  3,398,917

DISCHARGING DEVICE FOR LOADS ON A PALLET IN AN AIRPLANE

Filed Feb. 13, 1967  7 Sheets-Sheet 1

Fig.1

INVENTOR.
Volkmar Grabe
BY

Aug. 27, 1968 V. GRABE 3,398,917
DISCHARGING DEVICE FOR LOADS ON A PALLET IN AN AIRPLANE
Filed Feb. 13, 1967 7 Sheets-Sheet 3

INVENTOR.
Volkmar Grabe
BY

Aug. 27, 1968 V. GRABE 3,398,917
DISCHARGING DEVICE FOR LOADS ON A PALLET IN AN AIRPLANE
Filed Feb. 13, 1967 7 Sheets-Sheet 4

INVENTOR.
Volkmar Grabe
BY

Aug. 27, 1968   V. GRABE   3,398,917
DISCHARGING DEVICE FOR LOADS ON A PALLET IN AN AIRPLANE
Filed Feb. 13, 1967   7 Sheets-Sheet 6

INVENTOR.
Volkmar Grabe
BY

Aug. 27, 1968  V. GRABE  3,398,917
DISCHARGING DEVICE FOR LOADS ON A PALLET IN AN AIRPLANE
Filed Feb. 13, 1967  7 Sheets-Sheet 7

INVENTOR.
Volkmar Grabe
BY

United States Patent Office 3,398,917
Patented Aug. 27, 1968

3,398,917
DISCHARGING DEVICE FOR LOADS ON A PALLET IN AN AIRPLANE
Volkmar Grabe, Bremen, Germany, assignor to Vereinigte Flugtechnische Werke Gesellschaft mit beschrankter Haftung fruher Weser Flugzeugbau Focke-Wulf Heinkel-Flugzeugbau, Bremen, Germany
Filed Feb. 13, 1967, Ser. No. 615,557
Claims priority, application Germany, Feb. 11, 1966, V 30,372
16 Claims. (Cl. 244—137)

ABSTRACT OF THE DISCLOSURE

Invention concerns device for controlling the discharge load carrying pallets from an airplane in which rails support the pallets and latches held the pallets in place on the rails with a shaft connected to the latches to operate them into release position and means to actuate the shaft.

---

The present invention relates to a release device for loads placed on a pallet (platform or open box) in an airplane which release device is connected to a latch adapted in particular by means of an auxiliary parachute to be brought into opening or releasing position.

Load transporting devices for airplanes are known in which the loads are connected to pallets and are in this manner loaded into the airplane. Transporting and releasing devices are known in which the said pallets with the loads are by means of auxiliary parachutes discharged from the airplane. The auxiliary parachute may pull out either the pallet together with the load parachute which is released by means of a static line connected to the airplane, or the said auxiliary parachute may release only the load parachute which then in its turn pulls out the load.

These heretofore known devices, however, have the drawback that they are limited to the employment of special pallets and are rather complicated and subject to disorders.

It is, therefore, an object of the present invention to provide a release or discharge device which is simple and will be suitable for use in connection with special pallets as well as with all other pallets up to the width of the entire system.

It is a further object of this invention to provide a release or discharge device which can also be used entirely without pallets for the transport and the discharge of the load.

It is still another object of this invention to provide an auxiliary device which while requiring less effort and time as well as care by the operator will be reliable in operation for the turning of the shaft actuating the securing or latching levers.

These and other objects and advantages of the invention will appear more clearly from the following specification in connection with the accompanying drawings, in which.

According to the present invention, a pullcord connected to the auxiliary parachute or a cord adapted to be operated by the pilot is connected at least to one shaft which extends laterally of the load in longitudinal direction, and the said pullcord or cord or rope operable by the pilot is adapted by means of a lever connected to the shaft to turn said shaft until a loop of the pullcord is detached from the lever, or a lever actuating the cord or rope is made ineffective. After a certain rotation of the shaft, one or more securing or latching levers which in rest position establish a connection between the pallet and a longitudinally extending rail fixedly arranged in the airplane will free the said connection so that the pallet with its load can be discharged. In this connection, guiding means may be provided in which the loop slides until the rotation of the shaft has been completed. The securing or latching lever or levers may be rotatable about a shaft fixed in the airplane or through a link or the like may be pivotally connected to a lever fixedly connected to the shaft. Preferably, the securing or latching lever is shaped in the form of a hook the closed arc of which is pivotally engaged by links or plates while the upper portion of the hook, when the load is secured or latched, forms an eye with the lateral rail, said eye being adapted to receive a securing gear.

Preferably, an auxiliary device is provided by means of which the rotatable shaft is rotatable independently of an auxiliary parachute by hand for releasing the load. This auxiliary device preferably comprises a pullrod with longitudinal openings engaged by a lever of a pulley while the rope of the pulley is passed to the shaft and rotates the latter for releasing the load when the pullrod is being pulled whereby the pulley is turned by the lever. In case the levers are mounted on the shaft one behind the other, the longitudinal openings associated with said levers may increase in length from the end of the airplane toward the front thereof so that the loads can be discharged individually starting with the load which is closest to the fuselage door.

According to a modified auxiliary device according to the invention, a shaft extending parallel to the shaft which actuates the unlatching levers is driven by a motor and in its turn drives a transmission which imparts upon said shaft which actuates the unlatching lever a rotary step in the sense of releasing the load. The said transmission is provided with a limit switch which after completion of said rotary step stops the driving motor.

The present invention also comprises a safety circuit which brings about that the motor which drives the transmission can be switched on only when the stern door of the airplane is open.

Figure 1:
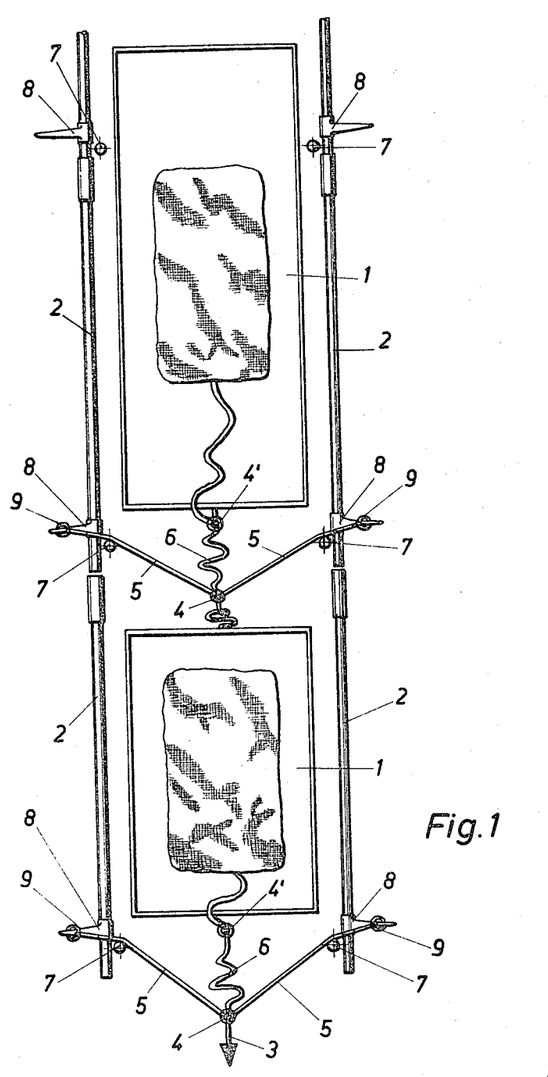
FIG. 1 diagrammtically illustrates two pallets arranged one behind the other and equipped with a latching device.
Figure 2:
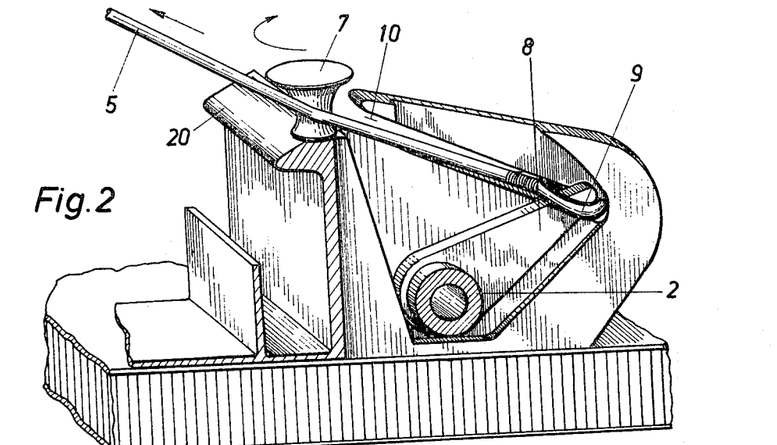
FIG. 2 shows a portion of an unlatching device in latched condition.
Figure 3:
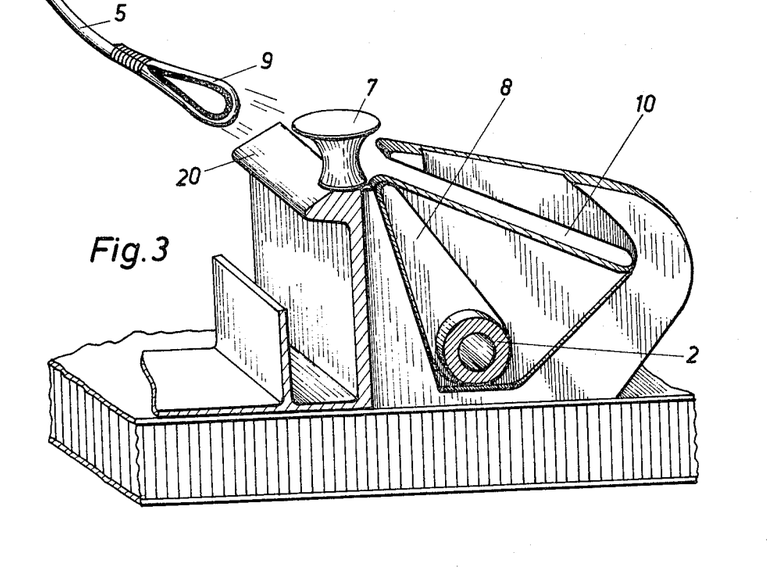
FIG. 3 shows the part of FIG. 2 in unlatched condition.
Figure 4:
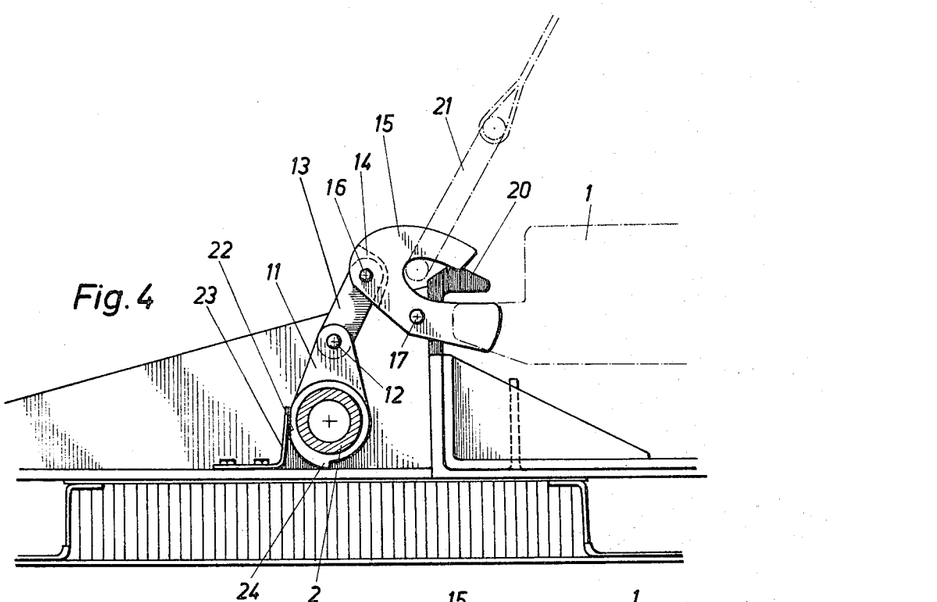
FIG. 4 shows a latching device in latched condition with inserted securing gear.
Figure 5:
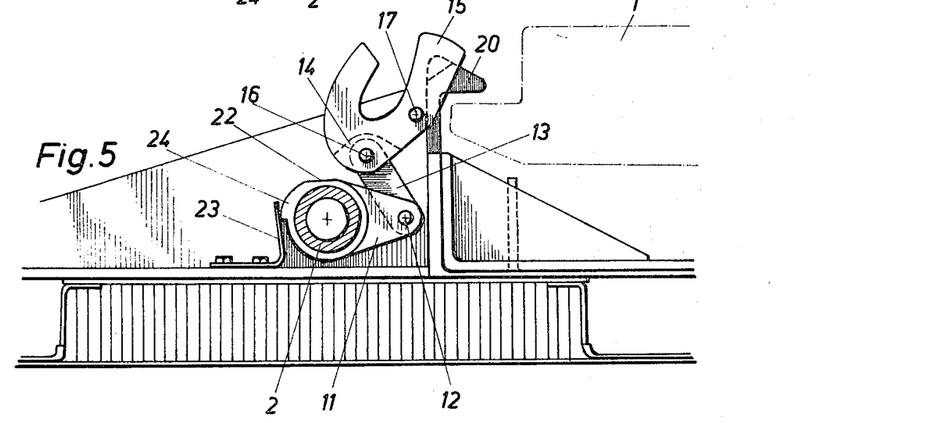
FIG. 5 shows the arrangement of FIG. 4 in unlatched condition.

Referring now to the drawings, FIG. 1 shows two serially arranged pallets 1 provided for a tandem drop. At both sides of the bottom of the load chamber there is provided one rotatable shaft section 2 each. A non-illustrated auxiliary parachute engages a pullcord 3 connected to a ring 4. Connected to said ring 4 are further pullcords 5 and 6 of which the pullcords 5 have their free ends each provided with a loop 9, whereas the pullcord 6 is connected to a ring 4' which in its turn is connected to a pallet. The loops 9 engage levers 8 which are connected to the shaft sections 2 and, more specifically, are connected to the lever ends. The loops 9 are guided in guiding means 10 (FIGS. 2 and 3) which only after the shaft section 2 has been rotated by a certain angle will permit the sliding off of loop 9 from the end of lever 8. The pullcords 5 are each passed over a deviating roller 7.

Figure 6:
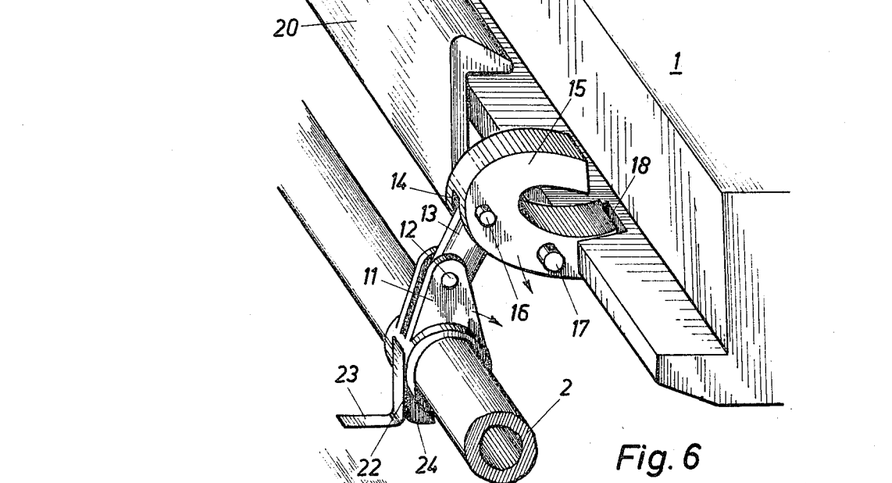
FIG. 6 shows the engagement of the unlatching device with a recess in the pallet.
Figure 7:
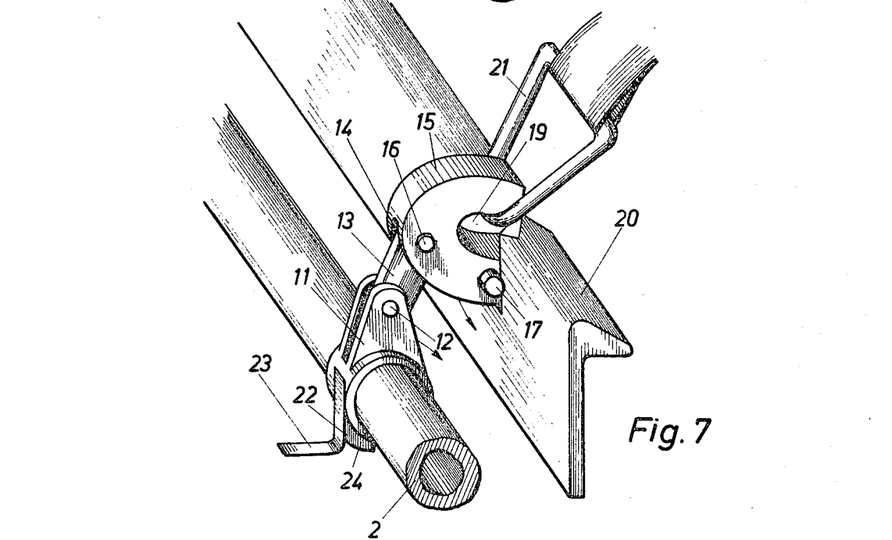
FIG. 7 illustrates the unlatching of a securing gear with the latching device.

Corresponding devices are provided for the succeeding pallets. During a tandem drop, the, or each dropped pallet 1, pulls on the next succeeding pallet and brings about the rotation of the respective shaft section 2 pertaining thereto. Fixedly connected to the shaft section 2 is a lever 11 (FIGS. 4 to 7) which during the rotation of the shaft section 2 is likewise turned. At the free end of lever 11, a link 13 is rotatably journalled by means of a bolt 12. The said link has its other end pivotally connected to a fast securing or clamping lever 15 and, more specifically, to a pin 16. Lever 15 is provided with a cutout 14 which permits the tilting of link 13. Lever 15 which is journalled on a shaft 17 stationarily located in the airplane has the shape of a hook. When the shaft section 2 is rotated, this movement is through the lever 11 and link 13 conveyed to the securing lever 15 through the intervention of a tilting movement. The lower portion of lever 15 extends through a gap 19 (FIG. 7) in a lateral rail 20 into a recess 18 of the pallet 1 (FIG. 6) and latches said pallet. The hook-shaped upper portion of lever 15 together with the two sides of gap 19 of the lateral rail 20 forms an eye for receiving a securing gear 21 for safety purposes. For securing lever 15 against undesired opening due to shocks, there is provided a leaf spring 23 which in the latching position of lever 15 rests against a plane surface 22 of a cam 24 associated with lever 11.

For purposes of opening the securing lever 15, the shaft section 2 is turned in the direction toward the lateral rail 20. Through the intervention of lever 11, rail 20 pulls lever 13 downwardly and tilts lever 15 upwardly out of the range of lateral rail 20. In this way, lever 15 releases the pallet 1. At the same time, the upper hook-shaped portion of lever 15 moves away from rail 20 and thus releases or frees a securing gear 21 which might have been inserted thereinto. A plurality of fast securing levers 15 is combined to a section. A plurality of such sections can be coupled by couplings to a drop unit.

Figures 8, 9:
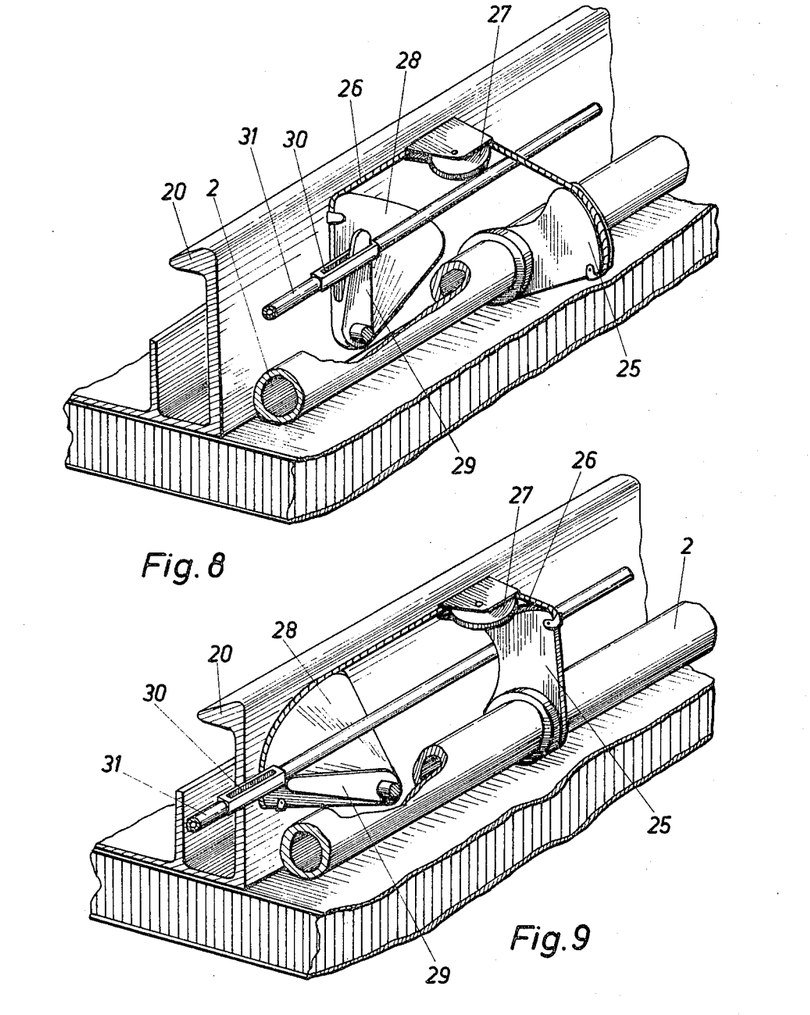
FIG. 8 shows an auxiliary device for transmitting the movement of a pullrod to the rotary movement of a shaft in latched condition.
FIG. 9 shows the arrangement of FIG. 8 in unlatched condition.

By means of an auxiliary device, the releasing or unlatching can be effected also without auxiliary parachute, i.e. manually, preferably from the pilot's cabin. To this end, each section of the shaft section 2 has mounted thereon an additional release lever 25 (FIGS. 8 and 9) which is connected to a pulley 28 through the intervention of a rope or cable 26 passing over a deviating pulley 27. Mounted on pulley 28 is a lever 29 which engages oblong holes 30 in a pullrod 31. By actuation of the pullrod 31, lever 29 and thus pulley 28 is turned. This turning movement is through rope or cable 26 via deviating pulley 27 conveyed to the release lever 25 whereby shaft section 2 is turned in its releasing direction for releasing the load. The oblong holes 30 associated with levers 29 and provided in pullrod 31 increase in length from the airplane door toward the front whereby the individual sections can be unlatched individually, starting with that section which is closest to the airplane door.

Figure 10:
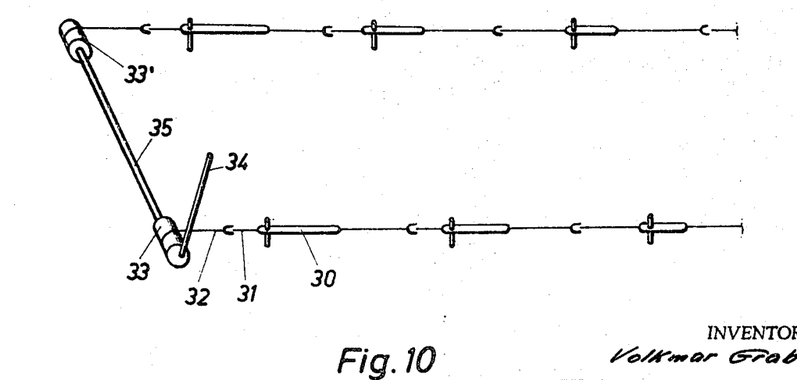
FIG. 10 diagrammatically illustrates the arrangement of a pullrod provided with longitudinal openings for operating the latching device and the adjusting means therefor.

The actuation of the pullrod 31 is effected through the intervention of a tackle 32 (FIG. 10) and a drum 33 on a lever 34. This movement is through the intervention of a shaft 35 conveyed to a further drum 33' on the other side of the load bottom.

Figures 11, 13:
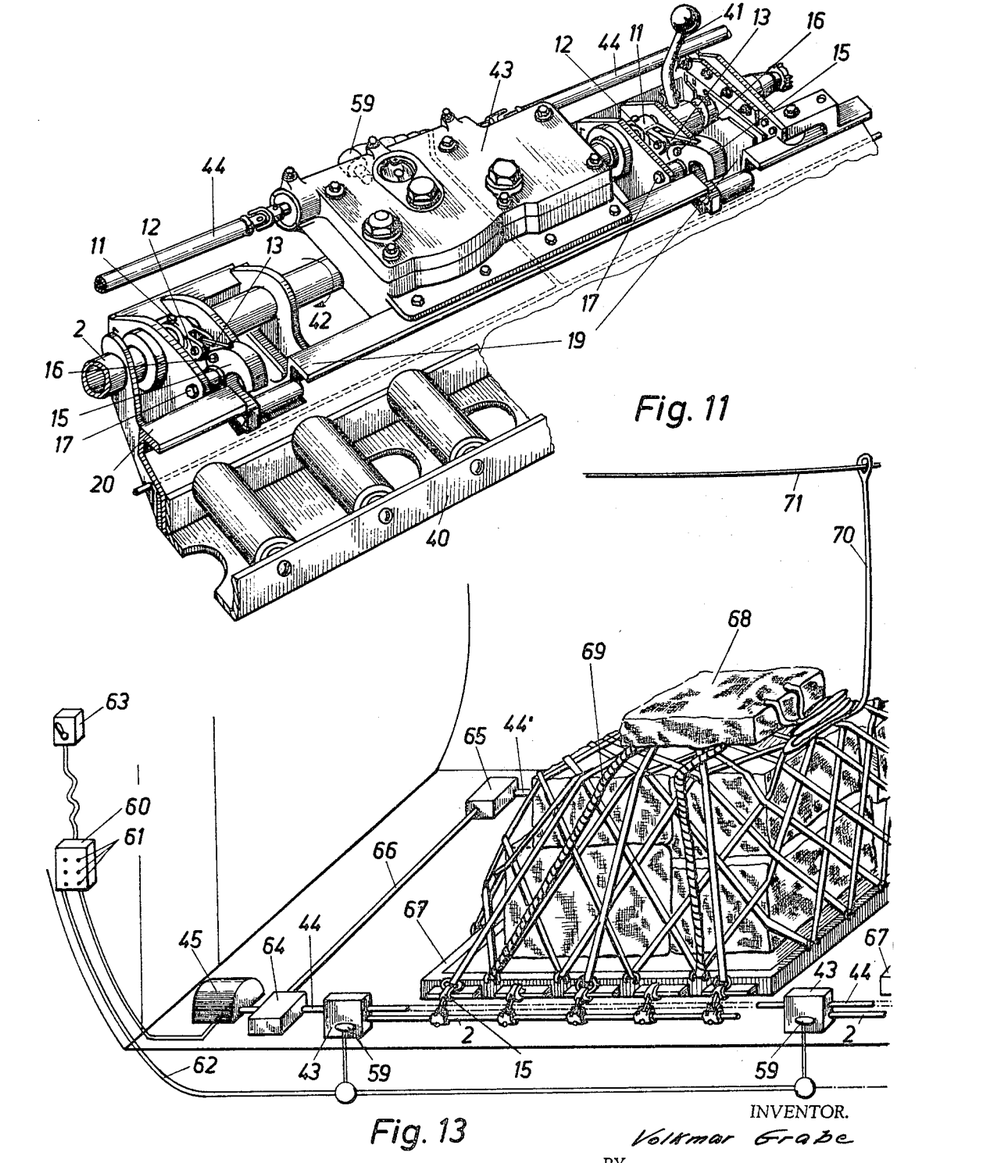
FIG. 11 is an isometric view of a modified auxiliary device according to the invention.
FIG. 13 shows the auxiliary device of FIGS. 11 and 12 within a fuselage.

Referring now to FIG. 11 showing a modified auxiliary device, the arrangement illustrated therein comprises a roller conveyor 40 (a portion thereof only being shown) which is connected to the bottom of the airplane and extends in the longitudinal direction of the latter. The pallets with the loads mounted thereon can be pushed over said roller conveyor 40 into the freight compartment. The latching or securing of the pallets by means of levers 15 is effected for each load section by a lever 41 mounted on the shaft section 2. For purposes of unlatching or releasing the pallets, the shaft section 2 is turned by a transmission 43 in the direction of the arrow 42 (FIG. 11). The transmission 43 imparts upon the shaft section 2 only that rotary step which is required for the turning of lever 15 in the unlatching direction. Transmission 43 is driven by a motor 45 (FIG. 13) through the intervention of shaft 44. According to FIG. 12, shaft 44 drives transmission 43 in the direction of the arrows A and B through a worm 46 and a worm wheel 47. A cam disc 49 having a cam 48 is fixedly connected to worm wheel 47. During the rotation of the worm wheel 47 with cam disc 49, cam 48 engages a sliding roller 50 of an oscillating lever 52 which is rotatably journalled on a shaft 51, whereby said lever 52 carries out a tilting movement in the direction of the arrow C. In this way the pulling lever 53 which is linked to the oscillating lever 52 is pulled toward the front, and the shaft section 2 is turned in clockwise direction by means of the lever 54 firmly connected to shaft section 2. Lever 54 in its turn is through a bolt 55 pivotally connected to the pulling lever 53. This action initiates the tilting of lever 15 in its unlatching position in the manner described above. The maximum possible rotary step of shaft section 2 is completed when the oscillating lever 52 by moving its sliding roller 50 onto the peak of cam 48 has reached its maximum deviation. At this instant, lever 15 has reached its end position which completely unlatches the pallet. At the same instant, the control lever 57 which is pivotable about shaft 56 has by means of pin 58 on cam disc 49 been moved out of its rest position to such an extent that the pressure point of the limit turn-off switch 59 has been overcome, and the limit turn-off switch 59 becomes effective whereby the motor 45 (FIG. 13) driving shaft 44 will be stopped. In other words, the driving motor is stopped at the instant at which the securing or latching lever has fully released or freed the load to be dropped.

Figure 12:
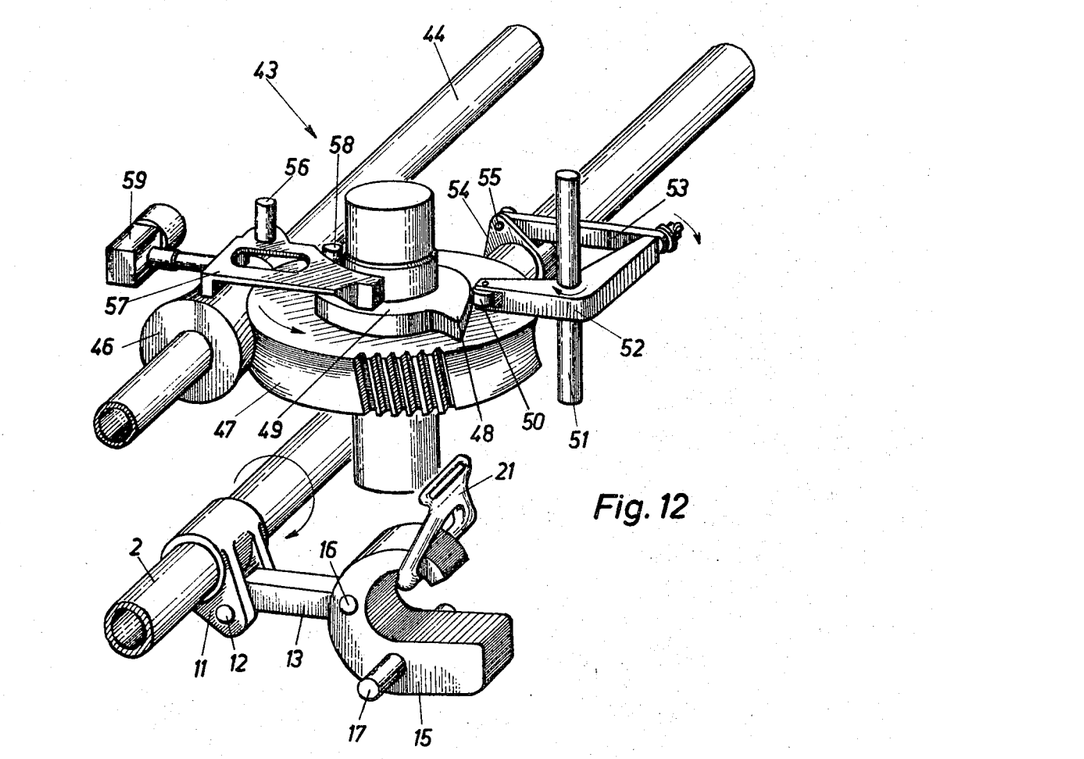
FIG. 12 is a simplified isometric view of the transmission for the auxiliary device according to FIG. 11.

When a plurality of serially arranged load sections and a corresponding number of shaft sections 2 are provided as well as a corresponding number of transmissions 43 associated therewith, the cams 48, cam disc 49 and pins 58 are with regard to their respective oscillating levers 52 and control levers 57 offset with regard to each other in such a way that when the motor 45 is turned on, first that load section will turn which is closest to the stern door of the airplane and pertains to that shaft section 2 which is associated therewith so that an unlatching will be effected. In this way it will be assured with absolute safety that always first that load is unlatched which is closest to the stern door of the airplane. After the unlatching operation has been effected in this load section, the motor 45 is stopped by means of the limit switch 59. At this time, the cam disc 49 of the transmission 43 pertaining to the next following load section has reached such a position that when the motor 45 is again turned on, cam 48 of cam disc 49 is just about to move against the oscillating lever 52. The just described cycle is then repeated, and the pallet provided in the second load section is unlatched. In the same manner the unlatching will be effected with all remaining load sections.

If it is desired that all pallets in the airplane or some of the serially arranged pallets are to be dropped over one and the same ground area, it is impractical to start the motor each time after a pallet has been unlatched. For this reason, in conformity with FIG. 13, a switch box 60 is arranged near the loading operator, said switch box 60 comprising a number of preselector switches 61 corresponding to the number of transmissions 43 and load sections. Each preselector switch 61 is associated with one of the transmissions 43 and is connected with the limit switch 49 respectively pertaining thereto in such a manner through line 62 that when the preselector switch 61 occupies its respective working position, said switch 61 will bridge the respective limit turn-off switch 59 pertaining thereto. If now motor 45 is turned on by switch 63 within the reach of the pilot, shaft 44 will continue its rotation without interruption until the unlatching has been completed in all of the preselected load sections. This device permits to preselect said unlatching of a plurality of serially arranged loads by actuation of the corresponding preselector switches. Over the area over which the loads are to be dropped, it is then merely necessary to start the motor which drives the transmission whereby the preselected loads are successively unlatched without the necessity of restarting the motor for each load. The preselected load sections and the effected unlatching are indicated to the pilot by signal lamps. Furthermore, on the switch box 60 of the loading operator, as well as within the reach of the pilot, there is provided an emergency unlatching switch by means of which, so to speak, all of the preselector switches can be actuated by pushbutton pressure so that in an emergency the entire load can be dropped without loss in time.

FIG. 13 also shows that the rotary movement of shaft 44 which is driven by motor 45 is through two angle drives or bevel gears 64 and 65 and through a shaft 66 interconnecting said drives 64 and 65 conveyed to a shaft 44' arranged on the other side of the freight compartment and corresponding to shaft 44 whereby the said rotary movement of shaft 44 is also conveyed to transmission 43' connected to shaft 44'.

The folded together load parachute 68 lies on the secured or latched load and is connected by ropes 69 to the pallet 67. The reference numeral 70 designates the static line which is guided on a cable 71 fastened to the airplane.

It will be understood that each shaft section 2 will remain in unlocking position until it is manually returned to locking position whether it is moved to unlocking position by hand, or by a parachute operated pull rope, or by motor.

FIG. 13 also shows how a switch 80 could be connected in the motor circuit, with switch 80 being operated by door 82 through which the pallets are to be discharged so the motor is enabled only when the door 82 is opened.

It is, of course, to be understood that the present invention is, by no means, limited to the particular constructions and embodiments illustrated in the drawings but also comprises any modifications within the scope of the appended claims.

What is claimed is:

1. A device for controlling the discharge of loaded pallet means from an airplane in which an unloading parachute is connected to the pallet means to pull the pallet means from the stern of the airplane, longitudinal rail means in the airplane receiving the pallet means, latch means operable to connect said pallet means to said rail means and thereby hold said pallet means in the airplane, said latch means having a first position wherein the pallet means are connected to the rail means and a second position wherein said pallet means are released from said rail means, shaft means extending longitudinally of the aircraft and operatively connected to said latch means so that in a first rotated position of said shaft means said latch means occupy said first position thereof while movement of said shaft means to a second rotated position will move said latch means to said second position thereof, and actuating means operatively connected to said shaft means and selectively operable for turning said shaft means from said first position thereof to said second position thereof.

2. A device according to claim 1 in which said actuating means comprises lever means on said shaft means, pull strand means having eye means receiving said lever means, and confining means adjacent said lever means arranged to expose the free end of said lever means in only the said second position of said shaft means so said eye means can slip off said lever means in only the said second position of said shaft means.

3. A device according to claim 1 in which said latch means comprise lever elements pivoted to the airplane, an actuator lever on said shaft means for each lever element, and a link drivingly connecting each actuator lever with the pertaining said lever element.

4. A device according to claim 3 in which each lever element comprises a U-shaped hook like member pivoted intermediate the ends of one of its legs to the airplane and having said link connected thereto near the juncture of the legs thereof, said one leg engaging the pertaining pallet means and the other of said legs forming a closed loop with said rail means when said latch means is in said first position, said closed loop being adapted for receiving the eye of securing gear pertaining to said pallet means, said one leg withdrawing from the pallet means and said other leg moving away from said rail means to open said closed loop when said latch means is moved to its second position.

5. A device according to claim 2 in which said pull strand means is connected to said unloading parachute to be actuated thereby prior to the unloading parachute acting on said pallet means.

6. A device according to claim 5 in which manually operable means are connected to said shaft means operable for turning said shaft means to said second position thereof independently of said lever means and pull strand means.

7. A device according to claim 5 which includes first auxiliary levers on said shaft means, second auxiliary levers pivoted in said airplane, cables connecting respective ones of said first auxiliary levers with respective ones of said second auxiliary levers, a pull rod, and means on the pull rod defining slots receiving said secondary auxiliary levers.

8. A device according to claim 7 in which said pallet means comprise a plurality to serially arranged pallets, said shaft means comprising a shaft section for each pallet and each said section having at least one of said second auxiliary levers associated therewith, and the slots in said pull rod progressively increasing in length from the stern of the airplane toward the front to provide for progressive releasing of said pallets.

9. A device according to claim 1 in which said actuating means comprises a motor, a drive shaft driven by the motor and extending longitudinally of the airplane, transmission means operatively connecting said drive shaft with said shaft means so rotation of said drive shaft will move said shaft means to its said second position and means for energizing said motor to drive said drive shaft.

10. A device according to claim 8 which includes control means operated by said transmission means operable for deenergizing said motor when said shaft means reaches said second position thereof.

11. A device according to claim 9 in which said transmission means includes worm means on said drive shaft, worm wheel means driven by said worm means, cam means fixed to the worm wheel means to rotate therewith, pivoted crank means having one arm engaging said cam means, and drive lever means on said shaft means connected to the other arm of said crank means to actuate the shaft means when said drive shaft rotates.

12. A device according to claim 11 in which said motor is an electric motor, switch means in circuit with said motor operable when actuated to halt the motor, and means operated by rotation of said worm means to actuate said switch means and halt said motor when said shaft means reaches its said second postiion.

13. A device according to claim 9 in which said pallet means comprises a plurality of pallets serially arranged on said rail means from back to front, said shaft means comprising a shaft section for each pallet, said transmission means comprising a transmission for each shaft section, said transmissions being so arranged that energization of said motor will actuate said shaft sections into their respective said second positions in succession commencing with the rearmost pallet and progressing forwardly.

14. A device according to claim 13 in which said motor is an electric motor and a manually operable control switch in circuit with said motor is provided for each pallet, and a limit switch in circuit with each control switch and operated into open position by the pertaining transmission when the pertaining shaft section reaches its said second position.

15. A device according to claim 14 in which said airplane has a pallet discharge door, and a switch in the motor circuit under the control of said door and operable to prevent energization of said motor when said door is closed.

16. A device according to claim 1 in which said rail means is located at the lateral sides of said pallet means and said shaft means is positioned adjacent said rail means.

References Cited

UNITED STATES PATENTS

| | | | |
|---|---|---|---|
| 3,251,489 | 5/1966 | Davidson | 244—137 X |
| 3,262,588 | 7/1966 | Davidson | 244—137 X |
| 3,357,372 | 12/1967 | Bader | 244—137 X |

MILTON BUCHLER, *Primary Examiner.*

T. W. BUCKMAN, *Assistant Examiner.*